US007713356B2

(12) United States Patent
Namikawa et al.

(10) Patent No.: US 7,713,356 B2
(45) Date of Patent: May 11, 2010

(54) CLEANING SHEET, CONVEYING MEMBER USING THE SAME, AND SUBSTRATE PROCESSING EQUIPMENT CLEANING METHOD USING THEM

(75) Inventors: Makoto Namikawa, Ibaraki (JP); Yoshio Terada, Ibaraki (JP); Jirou Nukaga, Ibaraki (JP); Eiji Toyoda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 94 days.

(21) Appl. No.: 10/297,173

(22) PCT Filed: May 8, 2001

(86) PCT No.: PCT/JP01/03848

§ 371 (c)(1),
(2), (4) Date: Dec. 3, 2002

(87) PCT Pub. No.: WO01/94036

PCT Pub. Date: Dec. 13, 2001

(65) Prior Publication Data

US 2003/0136430 A1 Jul. 24, 2003

(30) Foreign Application Priority Data

| | | |
|---|---|---|
| Jun. 6, 2000 | (JP) | 2000-168423 |
| Jun. 14, 2000 | (JP) | 2000-177963 |
| Jun. 14, 2000 | (JP) | 2000-177964 |
| Jul. 31, 2000 | (JP) | 2000-230339 |
| Aug. 11, 2000 | (JP) | 2000-243752 |
| Nov. 16, 2000 | (JP) | 2000-349840 |
| Jan. 12, 2001 | (JP) | 2001-004634 |

(51) Int. Cl.
*B08B 7/00* (2006.01)
*B32B 3/00* (2006.01)

(52) U.S. Cl. ............................ 134/6; 428/196; 428/197

(58) Field of Classification Search ..................... 134/6; 428/196, 197; 248/196, 197, 355 AC, 41.5, 248/41.8, 41.9, 343, 352
See application file for complete search history.

(56) References Cited

U.S. PATENT DOCUMENTS

| | | | | |
|---|---|---|---|---|
| 3,149,364 | A | | 9/1964 | Baptist et al. |
| 4,539,342 | A | | 9/1985 | Lee et al. |
| 5,415,889 | A | | 5/1995 | Uchida et al. |
| 5,853,633 | A | | 12/1998 | Kono et al. |
| 5,902,678 | A | | 5/1999 | Konda et al. |
| 6,055,392 | A | * | 4/2000 | Huver et al. .................. 399/98 |
| 6,126,772 | A | * | 10/2000 | Yamamoto et al. .......... 156/247 |
| 6,170,115 | B1 | * | 1/2001 | Tanaka et al. .............. 15/210.1 |
| 6,663,306 | B2 | | 12/2003 | Policicchio et al. |
| 6,741,086 | B2 | | 5/2004 | Maekawa et al. |
| 6,845,225 | B2 | | 1/2005 | Toyoda et al. |

FOREIGN PATENT DOCUMENTS

| | | | | |
|---|---|---|---|---|
| DE | 197 02 546 | C1 | | 1/1997 |
| DE | 298 05 040 | U1 | | 3/1998 |
| EP | 0-416-645 | A2 | | 3/1991 |
| EP | 0 658 828 | A1 | | 6/1995 |
| EP | 0 930 538 | | | 7/1997 |
| EP | 0930538 | | * | 7/1999 |
| JP | 58-50435 | U | | 4/1983 |
| JP | 61-138253 | A | | 6/1986 |
| JP | 1-187458 | A | | 7/1989 |
| JP | 2-91241 | A | | 3/1990 |
| JP | 5-326471 | A | | 12/1993 |
| JP | 6-173041 | A | | 6/1994 |
| JP | 6-274072 | | | 9/1994 |
| JP | 7-41737 | A | | 2/1995 |
| JP | 7-65362 | A | | 3/1995 |
| JP | 07128368 | | * | 5/1995 |
| JP | 7-142440 | A | | 6/1995 |
| JP | 07 128368 | | | 9/1995 |
| JP | 07-236863 | | | 9/1995 |
| JP | 8-85070 | A | | 4/1996 |
| JP | 08-115896 | | | 5/1996 |
| JP | 8-115897 | | | 5/1996 |
| JP | 8-124892 | A | | 5/1996 |
| JP | 8-139067 | A | | 5/1996 |
| JP | 8-181158 | A | | 7/1996 |
| JP | 8-323572 | A | | 12/1996 |
| JP | 9-28645 | A | | 2/1997 |
| JP | 10-129078 | A | | 5/1998 |
| JP | 10-154686 | | | 6/1998 |

(Continued)

OTHER PUBLICATIONS

Kunststoff-Kompendium, Adolf Franz, Karlheinz Biederbick, First Edition, Vogel-Buchverlag Würzburg 1984, p. 292.

(Continued)

*Primary Examiner*—Michael Barr
*Assistant Examiner*—Saeed T Chaudhry
(74) *Attorney, Agent, or Firm*—Sughrue Mion, PLLC

(57) ABSTRACT

A cleaning sheet for cleaning foreign matters away from the interior of the substrate processing equipment is provided. The cleaning sheet includes a cleaning layer having substantially no tackiness and having a tensile modulus of not lower than 0.98 $N/mm^2$ as determined according to JIS K7127. Alternatively, the cleaning sheet includes a cleaning layer having a Vickers hardness of not lower than 10.

16 Claims, No Drawings

FOREIGN PATENT DOCUMENTS

| | | | | |
|---|---|---|---|---|
| JP | 11-043656 | A | | 2/1999 |
| JP | 11-224895 | A | | 8/1999 |
| JP | 11-228994 | A | | 8/1999 |
| JP | 11-269436 | A | | 10/1999 |
| JP | 2000-109530 | A | | 4/2000 |
| JP | 2000-128945 | A | | 5/2000 |
| JP | 2000-288482 | A | | 10/2000 |
| JP | 2000-312862 | | * | 11/2000 |
| JP | 2000-312862 | A | | 11/2000 |
| JP | 2001-181962 | A | | 7/2001 |
| JP | 2001-198540 | | * | 7/2001 |
| JP | 2001-198540 | A | | 7/2001 |
| JP | 2001-264975 | A | | 9/2001 |
| JP | 2002-79190 | A | | 3/2002 |
| JP | 2002-249749 | A | | 9/2002 |
| JP | 2003-68810 | A | | 3/2003 |
| JP | 2003-115521 | A | | 4/2003 |
| KR | 0073655 | | | 4/1991 |
| WO | WO 97 00534 | | | 1/1997 |

OTHER PUBLICATIONS

Japanese Office Action for JP Application 2001-309340 dated Nov. 27, 2006, with a partial English language translation.

Japanese Office Action for JP Application 2001-309340 dated Aug. 15, 2007, with a partial English language translation.

Japanese Notification of Reason for Refusal dated Mar. 10, 2009.

Japanese Notification of Reasons for Refusal dated May 26, 2009.

Japanese Notification of Reasons for Refusal dated Jul. 7, 2009.

Japanese Notification of Reasons for Refusal dated Jul. 14, 2009.

Japanese Office Action dated Jun. 30, 2009.

Notification of Reasons for Refusal issued in counterpart Japanese Application No. 2000-177964 dated Feb. 9, 2010.

* cited by examiner

CLEANING SHEET, CONVEYING MEMBER USING THE SAME, AND SUBSTRATE PROCESSING EQUIPMENT CLEANING METHOD USING THEM

TECHNICAL FIELD

The present invention relates to a sheet for cleaning various equipments. More particularly, the present invention relates to a cleaning sheet for a substrate processing equipment which is apt to be easily damaged by foreign matters such as equipment for producing or inspecting semiconductor, flat panel display, printed circuit board, etc., a conveying member comprising same, and a method for cleaning a substrate processing equipment using same.

BACKGROUND ART

Various substrate processing equipments are adapted to convey various conveying systems and substrates while allowing them to come in physical contact with each other. During this operation, when foreign matters are adhered to these substrates and conveying systems, the subsequent substrates can be successively contaminated. This, it is necessary that the equipment be regularly suspended for cleaning purpose. This causes the drop of operating efficiency or requires much labor to disadvantage. In order to solve these problems, a method has been proposed which comprises conveying a substrate having an adhesive material attached thereto to clean foreign matters away from the interior of the substrate processing equipment (as in Unexamined Japanese Patent Publication 10-154686).

The method which comprises conveying a substrate having an adhesive material attached thereto to clean foreign matters away from the interior of the substrate processing equipment is an effective method for overcoming the foregoing difficulties. However, this method is disadvantageous in that the adhesive material and the contact area of the equipment adhere to each other too strongly to peeled off each other, making it impossible to assure the complete conveyance of the substrate.

DISCLOSURE OF INVENTION

In light of these circumstances, an object of the invention is to provide a cleaning sheet which can certainly convey substrates to the interior of a substrate processing equipment as well as remove foreign matters attached to the interior of the equipment easily and certainly.

The inventors made extensive studies to accomplish the foregoing object. As a result, it was found that foreign matters can be simply and certainly removed without causing the foregoing problems by conveying a sheet having a cleaning layer or a substrate having such a sheet fixed thereto to clean foreign matters away from the interior of a substrate processing equipment wherein the cleaning layer has substantially no tackiness and a tensile modulus of not lower than a specific value or has surface free energy of less than a specific value or Vickers hardness of not lower than a specific value.

In other words, the present invention provides a cleaning sheet comprising a cleaning layer having substantially no tackiness and having a tensile modulus of not lower than $0.98 N/mm^2$ as determined according to JIS K7127. The cleaning layer may be provided on a base material, or may be provided on one side of the base material and an ordinary adhesive layer may be provided on the other. The cleaning layer preferably has substantially no tackiness and substantially no electrical conductivity. The cleaning layer preferably exhibits a surface free energy of less than $30 mJ/m^2$.

The present invention also provides a cleaning sheet comprising a cleaning layer having a Vickers hardness of not lower than 10. The cleaning layer may be provided on a base material, or may be provided on one side of a base material and an ordinary adhesive layer may be provided on the other.

The aforementioned cleansing sheets may be further modified from other aspects.

Features and advantages of the invention will be evident from the following detailed description of the preferred embodiments.

BEST MODE FOR CARRYING OUT THE INVENTION

In the cleaning sheet according to the invention, the cleaning layer (hereinafter, including forms such as single cleaning sheet, laminated sheet and sheet laminated with base material) needs to have substantially no tackiness and have a tensile modulus of not lower than $0.98 N/mm^2$, preferably from 0.98 to $4,900 N/mm^2$, more preferably from 9.8 to 3,000 $N/mm^2$ as determined according to JIS K7127. In accordance with the invention, the tensile modulus of the cleaning layer is designed to fall within the above defined specific range, making it possible to remove foreign matters without causing any troubles in conveyance. When the tensile modulus of the cleaning layer falls below $0.98 N/mm^2$, the cleaning layer becomes adhesive and thus can adhere to the interior area of the equipment to be cleaned during conveyance, causing troubles in conveyance.

The cleaning layer exhibits a 180° peel adhesion of not greater than 0.20 N/10 mm, preferably from 0.01 to 0.1 N/10 mm with respect to silicon wafer (mirror surface). When the peel adhesion of the cleaning layer exceeds 0.20 N/10 mm, the cleaning layer adheres to the interior area of the equipment to be cleaned, causing troubles in conveyance.

It is preferred that the cleaning layer in the cleaning sheet of the invention be made of a layer having substantially no tackiness and substantially no electrical conductivity. In the invention, the cleaning sheet can be designed such that the cleaning layer has substantially no tackiness and substantially no electrical conductivity, making it possible to remove foreign matters by an electrostatic attraction without causing any trouble in conveyance.

The cleaning layer preferably exhibits a surface resistivity of not lower than $1\times10^{13}$ Ω/□, more preferably not lower than $1\times10^{14}$ Ω/□. By designing the cleaning sheet such that the surface resistivity of the cleaning layer is predetermined to be not lower than such a specific value to make the cleaning layer insulating as much as possible, an electrostatic effect of catching and adsorbing foreign matters can be exerted. Accordingly, when the surface resistivity of the cleaning layer falls below $1\times10^{13}$ Ω/□, the electrostatic effect of catching and adsorbing foreign matters can be impaired.

The cleaning layer is not specifically limited in its material and structure so far as it has substantially no tackiness and substantially no electrical conductivity. Examples of such a material include a film of plastic such as polyethylene, polyethylene terephthalate, acetyl cellulose, polycarbonate, polypropylene, polyamide, polyimide and polycarbodimide, and a material having substantially no tackiness obtained by hardening a hardenable adhesive.

The cleaning layer in the cleaning sheet of the invention preferably exhibits a surface free energy of less than 30 $mJ/m^2$, preferably from 25 to 15 $mJ/m^2$. The term "surface free energy of cleaning layer (solid)" as used herein is meant to indicate a value determined by solving as a simultaneous linear equation two equations obtained by substituting measurements of contact angle of the surface of the cleaning layer with respect to water and methylene iodide and the surface free energy of these liquids used in the measurement of contact angle (known from literatures) in Young's equation and the following equation (1) derived from extended Fowkes' equation.

$$(1+\cos\theta)\gamma_L=2\sqrt{(\gamma_s^{d}\gamma_L^{d})}+2\sqrt{(\gamma_s^{p}\gamma_L^{p})} \qquad (1)$$

where θ represents a contact angle; $\gamma_L$ represents the surface free energy of the liquid used in the measurement of contact angle; $\gamma_L^{d}$ represents the dispersion force component in $\gamma_L$; $\gamma_L^{p}$ represents the polar force component in $\gamma_L$; $\gamma_s^{d}$ represents the dispersion force component in the surface free energy of solid; and $\gamma^{s}_{p}$ represents the polar force component in the surface free energy of solid.

The cleaning sheet is preferably designed such that the surface of the cleaning layer exhibits a contact angle of more than 90 degrees, more preferably more than 100 degrees with respect to water. In the invention, by designing the cleaning layer such that it exhibits a surface free energy and a contact angle with respect to water falling within the range defined above, an effect of conveying the cleaning sheet certainly without causing the cleaning layer to adhere firmly to the position to be cleaned during conveyance can be exerted.

The cleaning layer in the second cleaning sheet of the invention needs to have a Vickers hardness of not lower than 10, preferably from 20 to 500. The term "Vickers hardness" as used herein is meant to indicate a value obtained by dividing a predetermined load applied to a diamond indenter according to JIS Z2244 by the surface area of the resulting dent. In the invention, by designing the cleaning sheet such that the Vickers hardness of the cleaning layer is not lower than the predetermined value, an effect of conveying the cleaning sheet without causing the cleaning layer to come in close contact with the position to be cleaned during conveyance can be exerted.

The cleaning layer in the second cleaning sheet of the invention preferably exhibits a surface free energy of less than 30 mJ/m$^2$, more preferably from 15 to 25 mJ/m$^2$. The cleaning layer exhibits a surface contact angle of greater than 90 degrees, preferably greater than 100 degrees with respect to water. In the invention, by designing the cleaning layer such that it exhibits a surface free energy and a contact angle with respect to water falling within the range defined above, an effect of conveying the cleaning sheet certainly without causing the cleaning layer to adhere firmly to the position to be cleaned during conveyance can be exerted.

The foregoing cleaning layer is not specifically limited in its material, etc. so far as it has a tensile modulus or Vickers hardness of not lower than the above defined value and has substantially no tackiness. In practice, however, there may be preferably used a material which can undergo accelerated crosslinking reaction or curing by an active energy such as ultraviolet light and heat to exhibit an enhanced tensile modulus.

The foregoing cleaning layer is preferably made of a material obtained by subjecting a pressure-sensitive adhesive polymer containing at least a compound having one or more unsaturated double bonds per molecule and a polymerization initiator to polymerization curing reaction with an active energy so that the tackiness thereof substantially disappears. A such a pressure-sensitive adhesive polymer there may be used an acrylic polymer comprising as a main monomer a (meth)acrylic acid and/or (meth)acrylic acid ester selected from the group consisting of acrylic acid, acrylic acid ester, methacrylic acid and methacrylic acid ester. When the synthesis of the acrylic polymer can be accomplished by using a compound having two or more unsaturated double bonds per molecule or chemically bonding a compound having unsaturated double bonds per molecule to the acrylic polymer thus synthesized through the reaction of functional groups so that unsaturated double bonds are introduced into the molecule of acrylic polymer, the resulting polymer itself can participate in the polymerization curing reaction by an active energy.

The compound having one or more unsaturated double bonds per molecule (hereinafter referred to as "polymerizable unsaturated compound") preferably is nonvolatile low molecular compound having a weight-average molecular weight of not higher than 10,000. In particular, the polymerizable unsaturated compound preferably has a molecular weight of not higher than 5,000 so that the adhesive layer can be three-dimensionally networked more efficiently during curing.

The polymerizable unsaturated compound also preferably is a nonvolatile low molecular compound having a weight-average molecular weight of not higher than 10,000. In particular, the polymerizable unsaturated compound preferably has a molecular weight of not higher than 5,000 so that the cleaning layer can be three-dimensionally networked more efficiently during curing. Examples of such a polymerizable compound include phenoxy polyethylene glycol(meth)acrylate, ϵ-caprolactone (meth)acrylate, polyethylene glycol di(meth)acrylate, polypropylene glycol di(meth)acrylate, trimethylolpropane tri(meth)acrylate, dipentaerythritol hexa (meth)acrylate, urethane (meth)acrylate, epoxy(meth)acrylate, and oligoester (meth)acrylate. These polymerizable compounds maybe used singly or in combination of two or more thereof.

As the polymerization initiator to be incorporated in the cleaning layer there may be used any known material without any restriction. If heat is used as an active energy, a heat polymerization initiator such as benzoyl peroxide and azobisisobutyronitrile may be used. If light is used as an active energy, a photopolymerization initiator such as benzoyl, benzoin ethyl ether, dibenzyl, isopropylbenzoin ether, benzophenone, Michler's ketone chlorothioxanthone, dodecyl thioxanthone, dimethyl thioxanthone, acetophenone diethyl ketal, benzyl dimethyl ketal, α-hydroxy cyclohexyl phenyl ketone, 2-hydroxy dimethyl phenyl propane and 2,2-dimethoxy-2-phenyl acetophenone may be used.

The thickness of the cleaning layer is not specifically limited. In practice, however, it is normally from about 5 to 100 μm.

The present invention also provides a cleaning sheet comprising the foregoing specific cleaning layer provided on one side of a base material and an ordinary adhesive layer provided on the other. The adhesive layer to be provided on the other side of the base material is not specifically limited in its material so far as it can exhibit a desired sticking function. An ordinary adhesive (e.g., acrylic adhesive, rubber-based adhesive) may be used.

In this arrangement, the cleaning sheet can be stuck to various substrates or other conveying members such as tape and sheet with an ordinary adhesive layer so that it can be conveyed to the interior of the equipment as a conveying member with a cleaning function to come in contact with the position to be cleaned, making it possible to clean the equipment.

In the case where the substrate is peeled off the adhesive layer after cleaning to re-use the foregoing conveying member such as substrate, the adhesive layer may have a 180° peel adhesion of from 0.01 to 0.98 N/10 mm, particularly from about 0.01 to 0.5 N/10 mm with respect to silicon wafer (mirror surface), making it possible to prevent the substrate from being peeled off the adhesive layer and easily peel the substrate after cleaning.

The base material on which the cleaning layer is provided is not specifically limited. As such a base material there may be used a film of a plastic such as polyethylene, polyethylene terephthalate, acetyl cellulose, polycarbonate, polypropylene and polyamide. The thickness of the base material is normally from about 10 to 100 μm.

The conveying member to which the cleaning sheet is stuck is not specifically limited. In practice, however, a substrate such as semiconductor wafer, substrate for flat panel display (e.g., LCD, PDP) and substrate for compact disk and MR head may be used.

The present invention further provides a member for cleaning various conduction inspection equipments, a method for cleaning a conduction inspection equipment using same, and a member and method for cleaning a conduction inspection equipment which is apt to be easily damaged by foreign matters.

Various conduction inspection equipments for use in the production of semiconductor inspect electrical conduction by bringing the contact point on the inspection equipment side (e.g., contact pin of IC socket) into contact with the terminal on the product side (e.g., terminal of semiconductor). During this procedure, when the inspection is repeated, the contact of IC terminal with the contact pin is repeated. As a result, the contact pin shaves the material on IC terminal side (e.g., aluminum, solder). The resulting foreign matters are attached to the contact pin side. Further, aluminum and solder which have thus been attached to the contact pin side are oxidized, causing defects due to insulation. In worst case, the electrical conductivity to be inspected can be lowered. In order to remove these foreign matters from the contact pin, a polyethylene terephthalate film coated with alumina particles or a member having abrasive grains incorporated in a rubber-based resin such as silicone (hereinafter referred to as "contact pin cleaner") is used. However, with the recent trend toward the reduction of the thickness of wafer and increase of the length of wafer in the process for the production of semiconductor, wafer can be damaged more by foreign matters on the inspection table (chuck table) and chucking error can occur more. Thus, some countermeasure needs to be taken to remove foreign matters from the chuck table. To this end, it is necessary that the operation of the conduction inspection equipment be regularly suspended to clean the chuck table, there by removing foreign matters therefrom. This causes the drop of operating efficiency or requires much labor to disadvantage.

Under these circumstances, another object of the invention is to provide a cleaning member and cleaning method which can clean the contact pin in the conduction inspection equipment as well as reduce the amount of foreign matters attached to the chuck table and conveying arm.

The inventors made extensive studies to accomplish the foregoing object. As a result, it was found that by conveying a cleaning member comprising a member for removing foreign matters attached to the conduction inspection contact pin in a conduction inspection equipment (hereinafter referred to as "contact pin cleaner") and a cleaning layer provided on one side of the contact pin cleaner for removing foreign matters attached to the contact area of the equipment with which the contact pin cleaner comes in contact (chuck table), the contact pin can be cleaned while removing foreign matters attached to the chuck table in the inspection equipment. It was also found that by predetermining the friction coefficient of the cleaning layer to be not lower than a specific value, the cleaning sheet can be certainly conveyed through the interior of the inspection equipment while simply reducing the amount of foreign matters. Thus, the present invention has been worked out.

In other words, the present invention also provides a cleaning member for conduction inspection equipment comprising a member for removing foreign matters attached to the conduction inspection contact pin in a conduction inspection equipment (hereinafter referred to as "contact pin cleaner") and a cleaning layer provided on one side of the contact pin cleaner for removing foreign matters attached to the contact area of the equipment with which the contact pin cleaner comes in contact.

The present invention further provides a cleaning member for conduction inspection equipment comprising a member provided on one side of a conveying member for removing foreign matters attached to the conduction inspection contact pin of the conduction inspection equipment (hereinafter referred to as "contact pin cleaner") and the foregoing cleaning sheet provided on the other for removing foreign matters attached to the contact area of an equipment with which said contact pin cleaner comes in contact.

The cleaning layer in the cleaning member of the invention is not specifically limited so far as it can be certainly conveyed through the interior of the inspection equipment as well as reduce the amount of foreign matters simply. In practice, however, the friction coefficient of the cleaning layer is preferably not lower than 1.0, more preferably from 1.2 to 1.8 from the standpoint of dust-removing properties and conveying properties. When the friction coefficient of the cleaning layer falls below 1.0, there is a fear that foreign matters on the chuck table cannot be certainly attached to the cleaning layer. On the contrary, when the friction coefficient of the cleaning layer exceeds the above defined range, there is a fear that the cleaning sheet can fail to be conveyed. In the present invention, the friction coefficient (μ) of the cleaning layer is determined by measuring the friction coefficient (F) developed when a stainless steel plate (50 mm×50 mm flat plate) is allowed to slide along the surface of the cleaning layer by means of a universal testing machine, and then substituting this measurement and the vertical load (W) applied to the steel plate during this process in the following equation (2). This represents a dynamic friction coefficient.

$$\mu=F/W \tag{2}$$

wherein μ represents a dynamic friction coefficient; F represents a frictional resistance (N); and W represents the vertical load (N) applied to steel plate.

The cleaning layer exhibits a tensile modulus of not higher than 2,000N/mm$^2$, preferably greater than 1 N/mm$^2$. When the tensile modulus of the cleaning layer exceeds 2,000 N/mm$^2$, there is a fear that foreign matters on the chuck table cannot be certainly attached to the cleaning layer. On the contrary, when the tensile modulus of the cleaning layer falls below 1 N/mm$^2$, there is a fear that the cleaning sheet can fail to be conveyed. In the invention, by predetermining the friction coefficient and the tensile modulus of the cleaning layer to be within the above defined range, the cleaning layer has substantially no tackiness during the conveyance of the cleaning sheet or the like, making it possible to exert an effect of conveying the cleaning sheet without causing the cleaning layer to adhere firmly to the position to be cleaned.

The contact pin cleaner to be used in the invention is not specifically limited in its material, shape and other factors. A wide range of materials can be used. For example, a film of a plastic such as polyethylene, polyethylene terephthalate, acetyl cellulose, polycarbonate, polypropylene, polyamide, polyimide and polycarbodimide, a rubber-based resin such as silicone or a substrate (backing) such as non-woven fabric coated with an abrasive grain such as particulate alumina, silicon carbide and chromium oxide may be used, but the present invention should not be construed as being limited thereto. The shape of the contact pin cleaner can be properly determined depending on the shape of socket and IC to be cleaned such as silicon wafer and IC chip and the kind of the equipment.

In this arrangement, the cleaning sheet can be conveyed to the interior of the equipment while being stuck to the contact pin cleaner for cleaning the contact pin on the non-cleaning side thereof or conveying member such as various substrates with a cleaning function with an ordinary adhesive layer to form a conveying member so that it comes in contact with the chuck table for cleaning.

The conveying member on which the cleaning layer is provided is not specifically limited. In practice, however, there may be used a semiconductor wafer, substrate for flat panel display such as LCD and PDP, substrate for compact disk and MR head, or a film of a plastic such as polyethylene, polyethylene terephthalate, acetyl cellulose, polycarbonate, polypropylene, polyamide, polyimide and polycarbodimide.

The present invention further provides a process for the production of a conveying member with a cleaning function for various substrate processing equipments, e.g., a process for the production of a conveying member with a cleaning function which is apt to be easily damaged by foreign matters such as equipment for producing or inspecting semiconductor, flat panel display, printed circuit board, etc.

The foregoing process for the production of a conveying member with a cleaning function (hereinafter referred to as "cleaning member") is disadvantageous in that when a cleaning member produced by laminating a conveying member such as substrate with a cleaning sheet having a shape greater than that of the conveying member is cut on the cleaning sheet along the profile of the conveying member (hereinafter this process will be referred to as "direct cutting process"), cutting wastes are produced from the cleaning layer during cutting and attached to the cleaning member to disadvantage. In the case where a cleaning sheet for label which has been previously processed into the shape of the conveying member is laminated with a conveying member to produce a cleaning member, the production of cutting wastes during the working of label can be inhibited as compared with direct cutting process. However, the cutting of sheet for label must be previously conducted, adding to the number of working steps required, complicating the process for the production of cleaning member and hence deteriorating the operating efficiency.

Under these circumstances, a further object of the invention is to provide a process for the preparation of a cleaning member which can certainly be conveyed through the interior of the substrate processing equipment, can certainly and simply remove foreign matters attached to the interior of the substrate processing equipment and produces no cutting wastes during the cutting of sheet by direct cutting process.

The inventors made extensive studies to accomplish the foregoing object. As a result, it was found that by making a cleaning layer of an adhesive which undergoes polymerization curing when acted upon by an active energy and conducting the polymerization curing reaction of the cleaning layer after cutting the cleaning sheet into the shape of the conveying member in the process for the production of a cleaning member which comprises laminating a conveying member such as substrate with a cleaning sheet wherein the production of the cleaning member is accomplished by direct cutting process, a cleaning member which can simply and certainly peel foreign matters can be produced without causing the foregoing problems. Thus, the present invention has been worked out.

In other words, the present invention further provides a process for the preparation of a conveying member with a cleaning function which comprises laminating a cleaning sheet having a cleaning layer made of an adhesive which undergoes polymerization curing when acted upon by an active energy provided on one side of a base material and an ordinary adhesive layer provided on the other with a conveying member with an ordinary adhesive layer interposed therebetween in such an arrangement that the shape of the cleaning sheet is greater than that of the conveying member, and then cutting said cleaning sheet along the profile of the conveying member, characterized in that the cleaning layer undergoes polymerization curing reaction after the cutting of the cleaning sheet along the profile of the conveying member.

In the process for the preparation of a cleaning member according to the invention, it is necessary that the cleaning layer be made of an adhesive which undergoes polymerization curing with an active energy and the polymerization curing be conducted after sheet cutting. This is because when the cleaning layer is allowed to undergo polymerization curing before sheet cutting, it undergoes crosslinking to have a higher elastic modulus, causing the production of a large amount of cutting wastes which are attached to the cleaning member or the equipment. In order to prevent the production of cutting wastes from the cleaning layer during sheet cutting, it is preferred that the tensile modulus of the cleaning layer be not higher than 1 $N/mm^2$, preferably not higher than 0.1 $N/mm^2$ as determined by a testing method according to JIS K7127. By predetermining the tensile modulus of the cleaning layer to be not higher than the foregoing specific range, the production of cutting wastes from the cleaning layer during sheet cutting can be prevented, making it possible to prepare a cleaning member free of cutting wastes by direct cutting process. Further, a cleaning layer made of an adhesive which undergoes polymerization curing can undergo polymerization curing after sheet cutting to have substantially no tackiness, making it possible to provide a cleaning member which can be certainly conveyed without firmly adhering to the contact area of the equipment.

In the present invention, the cleaning layer after sheet cutting exhibits a tensile modulus of not lower than 10 $N/mm^2$, preferably from 10 to 2,000 $N/mm^2$ due to the acceleration of crosslinking reaction or curing by an active energy. When the tensile modulus of the cleaning layer exceeds 2,000 $N/mm^2$, the capacity of removing foreign matters from the conveying system is deteriorated. On the contrary, when the tensile modulus of the cleaning layer falls below 10 $N/mm^2$, the cleaning layer adheres to the interior area of the equipment to be cleaned during conveyance, causing troubles in conveyance.

The preparation of the cleaning member according to the invention involves the use of a cleaning sheet comprising the foregoing specific adhesive layer provided as a cleaning layer on one side of a base material and an ordinary adhesive layer provided on the other, said cleaning layer being in uncured form.

The present invention will be further described in the following examples, but the present invention should not be construed as being limited thereto. The term “parts” as used hereinafter is meant to indicate parts by weight.

EXAMPLE 1

To 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 50 parts of a polyethylene glycol dimethacrylate, 50 parts of urethane acrylate, 3 parts of benzyl dimethyl ketal and 3 parts of diphenylmethane diisocyanate. The mixture was then uniformly stirred to obtain a solution of an ultraviolet-curing adhesive.

The adhesive which had been irradiated with ultraviolet light having a central wavelength of 365 nm in an integrated dose of 1,000 mJ/cm$^2$ to undergo curing exhibited a tensile modulus of 49 N/mm$^2$. The measurement of tensile was carried out by a testing method according to JIS K7127.

Separately, an adhesive solution obtained in the same manner as mentioned above except that the foregoing adhesive was free of benzyl dimethyl ketal was applied to the peel surface of a polyester peelable film having a thickness of 38 μm and a width of 250 mm to a dry thickness of 10 μm to provide an ordinary adhesive layer thereon. Subsequently, the foregoing ultraviolet-curing adhesive solution was applied to the peel surface of a polyester peelable film having a thickness of 38 μm to a dry thickness of 40 μm to provide a cleaning layer thereon. The two polyester peelable films were then laminated with each other in such an arrangement that the cleaning layer and the ordinary adhesive layer were opposed to each other.

The resulting sheet was then irradiated with ultraviolet light having a central wavelength of 365 nm in an integrated dose of 1,000 mJ/cm$^2$ to obtain a cleaning sheet according to the invention. The surface of the cleaning layer had substantially no tackiness.

The cleaning layer was measured for surface resistivity at a temperature of 23° C. and a relative humidity of 60% by means of a Type MCP-UP450 surface resistivity meter produced by Mitsubishi Chemical Corporation. As a result, the reading was greater than $9.99\times10^{13}$ Ω/□, making the measurement impossible.

The peelable film was then peeled off the cleaning sheet on the ordinary adhesive layer side thereof. The cleaning sheet was then stuck to the back side (mirror surface) of an 8 inch silicon wafer to prepare a conveying cleaning wafer with a cleaning function.

Separately, two wafer stages were removed from a substrate processing equipment, and then measured for the presence of foreign matters having a size of not smaller than 0.3 μm by means of a laser type foreign matter analyzer. As a result, foreign matters having a size of not smaller than 0.3 μm were found on an area having an 8 inch wafer size in a number of 18,000 on one of the two wafer stages and 17,000 on the other.

Subsequently, the peelable film was peeled off the foregoing conveying cleaning wafer on the cleaning layer side thereof. The conveying cleaning wafer was then conveyed to the interior of the substrate processing equipment having the wafer stage having 18,000 foreign matters attached thereto. As a result, the conveyance of the conveying cleaning wafer was conducted without any troubles. Thereafter, the wafer stage was removed, and then measured for the presence of foreign matters having a size of not smaller than 0.3 μm by means of a laser type foreign matter analyzer. As a result, foreign matters having a size of not smaller than 0.3 μm were found on an area having an 8 inch wafer size in a number of 4,000, demonstrating that ¾ or more of the foreign matters which had been attached before cleaning had been removed.

COMPARATIVE EXAMPLE 1

The cleaning layer in a cleaning sheet prepared in the same manner as in Example 1 except that the amount of benzyl dimethyl ketal was 0.05 parts had tackiness. The cleaning layer was then measured for tensile modulus. The results were 0.5 N/mm$^2$.

It was tried to convey a conveying cleaning wafer prepared from the foregoing cleaning sheet in the same manner as in Example 1 through the interior of the substrate processing equipment. However, the conveying cleaning wafer adhered to the conveying arm and thus could not be conveyed.

EXAMPLE 2

To 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 50 parts of a polyethylene glycol dimethacrylate, 50 parts of urethane acrylate, 3 parts of benzyl dimethyl ketal and 3 parts of diphenylmethane diisocyanate. The mixture was then uniformly stirred to obtain a solution of an ultraviolet-curing adhesive.

Separately, an adhesive solution obtained in the same manner as mentioned above except that the foregoing adhesive was free of benzyl dimethyl ketal was applied to one side of a polyester peelable film having a thickness of 25 μm and a width of 250 mm to a dry thickness of 10 μm to provide an ordinary adhesive layer thereon. A polyester peelable film having a thickness of 38 μm was then stuck to the surface of the ordinary adhesive layer. The foregoing ultraviolet-curing adhesive solution was applied to the other side of the base material film to a dry thickness of 40 μm to provide an adhesive layer as a cleaning layer thereon. A similar peelable film was then stuck to the surface of the cleaning layer.

The resulting sheet was then irradiated with ultraviolet light having a central wavelength of 365 nm in an integrated dose of 1,000 mJ/cm$^2$ to obtain a cleaning sheet according to the invention. The adhesive layer as a cleaning layer in the cleaning sheet which had been cured by ultraviolet light exhibited a tensile modulus of 49 N/mm$^2$. The measurement of tensile modulus was carried out by a testing method according to JIS K7127.

The adhesive layer on the cleaning layer side was stuck to the mirror surface of a silicon wafer at a width of 10 mm, and then measured for 180° peel adhesion with respect to silicon wafer according to JIS Z0237. The results were 0.08 N/10 mm.

The peelable film was then peeled off the cleaning sheet on the adhesive layer side thereof. The cleaning sheet was then stuck to the back side (mirror surface) of an 8 inch silicon wafer to prepare a conveying cleaning wafer with a cleaning function.

Separately, two wafer stages were removed from a substrate processing equipment, and then measured for the presence of foreign matters having a size of not smaller than 0.3 μm by means of a laser type foreign matter analyzer. As a result, foreign matters having a size of not smaller than 0.3 μm were found on an area having an 8 inch wafer size in a number of 25,000 on one of the two wafer stages and 22,000 on the other.

Subsequently, the peelable film was peeled off the foregoing conveying cleaning wafer on the cleaning layer side thereof. The conveying cleaning wafer was then conveyed to the interior of the substrate processing equipment having the wafer stage having 25, 000 foreign matters attached thereto. As a result, the conveyance of the conveying cleaning wafer was conducted without any troubles. Thereafter, the wafer stage was removed, and then measured for the presence of foreign matters having a size of not smaller than 0.3 μm by means of a laser type foreign matter analyzer. As a result, foreign matters having a size of not smaller than 0.3 μm were found on an area having an 8 inch wafer size in a number of 6,200, demonstrating that ¾ or more of the foreign matters which had been attached before cleaning had been removed.

COMPARATIVE EXAMPLE 2

A cleaning sheet was prepared in the same manner as in Example 2 except that it was irradiated with ultraviolet light having a central wavelength of 365 nm in an integrated dose of 5 $mJ/cm^2$. The cleaning sheet thus prepared was then measured for tensile modulus of cleaning layer in the same manner as in Example 2. The results were 0.67 $N/mm^2$. The adhesive layer of the cleaning layer was then measured for adhesion with respect to silicon wafer. The results were 0.33 N/10 mm.

It was tried to convey a conveying cleaning wafer prepared from the foregoing cleaning sheet in the same manner as in Example 2 through the interior of the substrate processing equipment having a wafer stage having 22,000 foreign matters attached thereto. As a result, the conveying cleaning wafer was fixed to the wafer stage. Thus, the conveying cleaning wafer could no longer be conveyed.

EXAMPLE 3

To 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 50 parts of a polyethylene glycol dimethacrylate, 50 parts of urethane acrylate, 3 parts of benzyl dimethyl ketal and 3 parts of diphenylmethane diisocyanate. The mixture was then uniformly stirred to obtain a solution of an ultraviolet-curing adhesive.

Separately, an adhesive solution obtained in the same manner as mentioned above except that the foregoing adhesive was free of benzyl dimethyl ketal was applied to one side of a polyester peelable film having a thickness of 25 μm and a width of 250 mm to a dry thickness of 10 μm to provide an ordinary adhesive layer thereon. A polyester peelable film having a thickness of 38 μm was then stuck to the surface of the ordinary adhesive layer. The foregoing ultraviolet-curing adhesive solution was applied to the other side of the base material film to a dry thickness of 40 μm to provide an adhesive layer as a cleaning layer thereon. A similar peelable film was then stuck to the surface of the cleaning layer.

The resulting sheet was then irradiated with ultraviolet light having a central wavelength of 365 nm in an integrated dose of 3,000 $mJ/cm^2$ to obtain a cleaning sheet according to the invention. The surface of the cleaning layer had substantially no tackiness. The cleaning layer which had been cured by ultraviolet light exhibited a tensile modulus of 0.58 $N/mm^2$. The measurement of tensile modulus was carried out by a testing method according to JIS K7127. The cleaning layer was stuck to the mirror surface of a silicon wafer at a width of 10 mm, and then measured for 180° peel adhesion with respect to silicon wafer according to JIS Z0237. The results were 0.0049 N/10 mm. It was thus confirmed that the cleaning layer has substantially no tackiness.

The cleaning layer was measured for surface resistivity at a temperature of 23° C. and a relative humidity of 60% by means of a Type MCP-UP450 surface resistivity meter produced by Mitsubishi Chemical Corporation. As a result, the reading was greater than $9.99\times10^{13}$ Ω/□, making the measurement impossible. It was thus confirmed that the cleaning layer has substantially no electrical conductivity.

The peelable film was then peeled off the cleaning sheet on the ordinary adhesive layer side thereof. The cleaning sheet was then stuck to the back side (mirror surface) of an 8 inch silicon wafer to prepare a conveying cleaning wafer with a cleaning function (1).

EXAMPLE 4

A polyester film having a thickness of 25 μm and a width of 250 mm was used as a cleaning layer. The same ordinary adhesive layer as used in Example 3 was provided on one side of the polyester film to a dry thickness of 10 μm. A polyester peelable film having a thickness of 38 μm was then stuck to the surface of the ordinary adhesive layer to prepare a cleaning sheet.

The polyester film as a cleaning layer exhibited a tensile modulus of 200 $N/mm^2$. The polyester film was also measured for 180° peel adhesion with respect to silicon wafer. The results were 0 N/10 mm. It was thus confirmed that the polyester film has substantially no tackiness.

The polyester film was measured for surface resistivity. However, the reading was greater than $9.99\times10^{13}$ Ω, making the measurement impossible. From these results, it was confirmed that the cleaning layer has substantially no electrical conductivity.

The peelable film was then peeled off the cleaning sheet. A cleaning wafer with a cleaning function (2) was then prepared in the same manner as in Example 3.

Separately, three sheets of brand-new 8 inch silicon wafers were measured for the presence of foreign matters having a size of not smaller than 0.2 μm on the mirror surface thereof by a laser type foreign matter analyzer. As a result, foreign matters were found in a number of 8 on the first sheet, 12 on the second sheet and 10 on the third sheet. These wafers were then conveyed to the interior of separate substrate processing equipments with its mirror surface facing downward. Thereafter, these wafers were each measured for the presence of foreign matters on the mirror surface thereof by means of a laser type foreign matter analyzer. Foreign matters having a size of not smaller than 0.2 μm were found on an 8 inch wafer size area in a number of 23,788 on the first silicon wafer, 26,008 on the second silicon wafer and 28,403 on the third silicon wafer.

Subsequently, the peelable film was peeled off the foregoing conveying cleaning wafer (1) on the cleaning layer side thereof. The conveying cleaning wafer (1) was then conveyed to the interior of the substrate processing equipment having the wafer stage having 23,788 foreign matters attached thereto. As a result, the conveyance was made with any troubles. Thereafter, the brand-new 8 inch silicon wafer having 7 foreign matters having a size of not smaller than 0.2 μm present thereon was conveyed to the interior of the substrate processing equipment with its mirror surface facing downward. These wafers were then each measured for the presence of foreign matters having a size of not smaller than 0.2 μm by means of a laser type foreign matter analyzer. As a result, foreign matters having a size of not smaller than 0.2 μm were found on an 8 inch wafer size area in a number of 6,205, demonstrating that 74% of foreign matters which had been attached before cleaning was removed.

Subsequently, the foregoing conveying cleaning wafer (2) was then conveyed to the interior of the substrate processing equipment having the wafer stage having 26,008 foreign matters attached thereto. As a result, the conveyance was made with any troubles. Thereafter, the brand-new 8 inch silicon wafer having 13 foreign matters having a size of not smaller than 0.2 μm present thereon was subjected to measurement in the same manner as mentioned above. As a result, foreign matters having a size of not smaller than 0.2 μm were found on an 8 inch wafer size area in a number of 7,988, demonstrating that 69% of foreign matters which had been attached before cleaning was removed.

COMPARATIVE EXAMPLE 3

The cleaning layer in a cleaning sheet prepared in the same manner as in Example 3 except that it was irradiated with ultraviolet light having a central wavelength of 365 nm in an integrated dose of 5 $J/cm^2$ had tackiness. The cleaning sheet thus prepared was then measured for tensile modulus of cleaning layer. The results were 0.067 $N/mm^2$. The cleaning layer was then measured for adhesion with respect to silicon wafer. The results were 0.33 N/10 mm.

It was tried to convey a conveying cleaning wafer (3) prepared from the foregoing cleaning sheet in the same manner as in Example 3 through the interior of the substrate processing equipment having a wafer stage having 28,403 foreign matters attached thereto. As a result, the conveying cleaning wafer was fixed to the wafer stage. Thus, the conveying cleaning wafer could no longer be conveyed.

EXAMPLE 5

To 100 parts of an acrylic polymer (weight-average molecular weight: 2,800,000) obtained from a monomer mixture comprising 30 parts of 2-ethylhexyl acrylate, 70 parts of methyl acrylate and 10 parts of acrylic acid were added 150 parts of dipentaerythritol hexaacrylate (trade name: UV 1700B, produced by Nippon Synthetic Chemical Industry Co., Ltd.), 3 parts of a polyisocyanate compound (trade name: Colonate L, produced by Nippon Polyurethane Industry Co., Ltd.) and 10 parts of benzyl dimethyl ketal (Irgacure 651, produced by Ciba Specialty Chemicals Co., Ltd.). The mixture was then uniformly stirred to obtain an ultraviolet-curing adhesive solution A. The ultraviolet-curing adhesive solution was then irradiated with ultraviolet light having a central wavelength of 365 nm in an integrated dose of 1,000 $mJ/cm^2$ to undergo curing. The surface of the cleaning layer had substantially no tackiness. The cleaning layer which had been cured with ultraviolet light exhibited a tensile modulus of 1,440 $N/mm^2$. The measurement of tensile was carried out by a testing method according to JIS K7127.

Separately, to 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 50 parts of a polyethylene glycol 200 dimethacrylate (trade name: NK Ester 4G, produced by Sninnakamura Chemical Co., Ltd.), 50 parts of urethane acrylate (trade name: U-N-01, produced by Sninnakamura Chemical Co., Ltd.) and 3 parts of a polyisocyanate compound (trade name: Colonate L, produced by Nippon Polyurethane Industry Co., Ltd.). The mixture was then uniformly stirred to prepare a pressure-sensitive adhesive solution B.

The pressure-sensitive adhesive solution B was then applied to one side of a polyester base material film having a thickness of 25 μm and a width of 250 mm to a dry thickness of 10 μm to provide an ordinary adhesive layer thereon. A polyester peelable film having a thickness of 38 μm was then stuck to the surface of the ordinary adhesive layer. Subsequently, the foregoing ultraviolet-curing adhesive solution A was applied to the other side of the base material film to a dry thickness of 10 μm to provide a cleaning layer thereon. A similar peelable film was then stuck to the surface of the cleaning layer.

The resulting sheet was then irradiated with ultraviolet light having a central wavelength of 365 nm in an integrated dose of 1,000 $mJ/cm^2$ to obtain a cleaning sheet according to the invention. The peelable film was then peeled off the cleaning sheet on the cleaning layer side thereof. The cleaning layer was then measured for surface free energy. The results were 18.4 $mJ/m^2$. The cleaning layer exhibited a contact angle of 105.1 degrees with respect to water.

The peelable film was then peeled off the cleaning sheet on the ordinary adhesive layer side thereof. The cleaning sheet was then stuck to the back side (mirror surface) of an 8 inch silicon wafer with a hand roller to prepare a conveying cleaning wafer with a cleaning function.

Separately, the wafer stage was removed from the substrate processing equipment, and then measured for the presence of foreign matters having a size of not smaller than 0.3 μm by a laser type foreign matter analyzer. As a result, foreign matters having a size of not smaller than 0.3 μm were found on an 8 inch wafer size area in a number of 21,000.

Subsequently, the peelable film was peeled off the cleaning wafer on the cleaning layer side thereof. The cleaning wafer was then conveyed to the interior of the substrate processing equipment. As a result, the cleaning layer didn't firmly adhere to the position to be cleaned even after 100 sheets of continuous conveyance. Thus, the conveyance was made without any troubles.

Thereafter, the wafer stage was removed from the substrate processing equipment, and then measured for the presence of foreign matters having a size of not smaller than 0.3 μm by a laser type foreign matter analyzer. As a result, foreign matters having a size of not smaller than 0.3 μm were found on an 8 inch wafer size area in a number of 10,000, demonstrating that half the foreign matters which had been attached before cleaning was removed.

COMPARATIVE EXAMPLE 5

As an adhesive for cleaning layer there was used an adhesive solution C prepared by a process which comprises adding 100 parts of a polyethylene glycol 200 dimethacrylate (trade name: NK Ester 4G, produced by Sninnakamura Chemical Co., Ltd.), 100 parts of a polyethylene glycol 600 diacrylate (trade name: NK Ester A-600, produced by Sninnakamura Chemical Co., Ltd.) and 3 parts of a polyisocyanate compound (trade name: Colonate L, produced by Nippon Polyurethane Industry Co., Ltd.) to 100 parts of an acrylic polymer (weight-average molecular weight: 2,800,000) obtained from a monomer mixture comprising 30 parts of 2-ethylhexyl acrylate, 70 parts of methyl acrylate and 10 parts of acrylic acid, and then stirring uniformly the mixture. The cleaning layer thus obtained was then measured for tensile modulus in the same manner as in Example 5. The results were 0.1 $N/mm^2$.

A cleaning sheet was prepared from the cleaning layer in the same manner as in Example 5. The cleaning layer was then measured for surface free energy. The results were 57.3 $mJ/m^2$. The cleaning layer exhibited a contact angle of 49.4 degrees with respect to water.

It was dried to convey a conveying cleaning wafer prepared from the foregoing cleaning sheet in the same manner as in Example 5 to the interior of the substrate processing equipment. As a result, the cleaning wafer was fixed to the wafer stage during the conveyance of the first sheet. Thus, the conveying cleaning wafer could no longer be conveyed.

EXAMPLE 6

To 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 100 parts of a polyethylene glycol 200 dimethacrylate (trade name: NK Ester 4G, produced by Sninnakamura Chemical Co., Ltd.), 3 parts of a polyisocyanate compound (trade name: Colonate L, produced by Nippon Polyurethane Industry Co., Ltd.) and 3 parts of a benzyl dimethyl ketal (Irgacure 651, produced by Ciba Specialty Chemicals Co., Ltd.) as a photopolymerization initiator. The mixture was then uniformly stirred to prepare an ultraviolet-curing adhesive solution A.

Separately, an adhesive solution obtained in the same manner as mentioned above except that the foregoing adhesive solution A was free of benzyl dimethyl ketal as a photopolymerization initiator was applied to one side of a polyester peelable film having a thickness of 38 μm and a width of 250 mm to a dry thickness of 10 μm to provide an ordinary adhesive layer thereon. A polyester peelable film having a thickness of 38 μm was then stuck to the surface of the ordinary adhesive layer. Subsequently, the foregoing ultraviolet-curing adhesive solution A was applied to the other side of the base material film to a dry thickness of 10 μm to provide an adhesive layer as a cleaning layer thereon. A similar peelable film was then stuck to the surface of the adhesive layer.

The resulting sheet was then irradiated with ultraviolet light having a central wavelength of 365 nm in an integrated dose of 2,000 $mJ/cm^2$to obtain a cleaning sheet according to the invention. The peelable film was then peeled off the cleaning sheet on the cleaning layer side thereof. The cleaning sheet was then measured for Vickers hardness of cleaning layer by means of a Type MHA-400 Vickers hardness meter produced by NEC. The results were 45.

The cleaning layer which had been cured with ultraviolet light exhibited a tensile modulus of 147.2 $N/mm^2$. The measurement of tensile modulus was carried out by a testing method according to JIS K7127. The cleaning layer was stuck to the mirror surface of a silicon wafer at a width of 10 mm, and then measured for 180° peel adhesion with respect to silicon wafer according to JIS Z0237. The results were 0.0049 N/10 mm. It was thus confirmed that the cleaning layer has substantially no tackiness.

The cleaning layer was measured for surface resistivity at a temperature of 23° C. and a relative humidity of 60% by means of a Type MCP-UP450 surface resistivity meter produced by Mitsubishi Chemical Corporation. As a result, the reading was greater than $9.99\times10^{13}$ Ω/□, making the measurement impossible. From these results, it was confirmed that the cleaning layer has substantially no electrical conductivity.

The peelable film was then peeled off the cleaning sheet. The cleaning sheet was then stuck to the back side (mirror surface) of an 8 inch silicon wafer to prepare a conveying cleaning wafer with a cleaning function.

Separately, two wafer stages were removed from a substrate processing equipment, and then measured for the presence of foreign matters having a size of not smaller than 0.3 μm by means of a laser type foreign matter analyzer. As a result, foreign matters having a size of not smaller than 0.3 μm were found on an area having an 8 inch wafer size in a number of 25,000 on one of the two wafer stages and 23,000 on the other.

Subsequently, the peelable film was peeled off the foregoing conveying cleaning wafer on the cleaning layer side thereof. The conveying cleaning wafer was then conveyed to the interior of the substrate processing equipment having the wafer stage having 25, 000 foreign matters attached thereto. As a result, the conveyance of the conveying cleaning wafer was conducted without any troubles. Thereafter, the wafer stage was removed, and then measured for the presence of foreign matters having a size of not smaller than 0.3 μm by means of a laser type foreign matter analyzer. As a result, foreign matters having a size of not smaller than 0.3 μm were found on an area having an 8 inch wafer size in a number of 4,800, demonstrating that ⅘ or more of the foreign matters which had been attached before cleaning had been removed.

COMPARATIVE EXAMPLE 6

A cleaning sheet was prepared in the same manner as in Example 6 except that as an adhesive for cleaning layer there was used an adhesive solution B prepared by a process which comprises adding 100 parts of a polyethylene glycol 600 diacrylate (trade name: NK Ester A-600, produced by Sninnakamura Chemical Co., Ltd.), 3 parts of a polyisocyanate compound (trade name: Colonate L, produced by Nippon Polyurethane Industry Co., Ltd.) and 10 parts of benzyl dimethyl ketal (tradename: Irgacure 651, produced by Ciba Specialty Chemicals Co., Ltd.) as a photopolymerization initiator to 100 parts of an acrylic polymer (weight-average molecular weight: 2,800,000) obtained from a monomer mixture comprising 30 parts of 2-ethylhexyl acrylate, 70 parts of methyl acrylate and 10 parts of acrylic acid, and then stirring uniformly the mixture. The cleaning sheet thus prepared was then measured for Vickers hardness of cleaning layer in the same manner as mentioned above. The results were 5. The cleaning layer was measured for surface free energy. The results were 34.6 $mJ/cm^2$. The cleaning layer exhibited a contact angle of 82.3 degrees with respect to water.

It was dried to convey a conveying cleaning wafer prepared from the foregoing cleaning sheet in the same manner as in Example 6 to the interior of the substrate processing equipment having the wafer stage having 23,000 foreign matters attached thereto. As a result, the cleaning wafer was fixed to the wafer stage during the conveyance of the first sheet. Thus, the conveying cleaning wafer could no longer be conveyed.

EXAMPLE 7

To 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 50 parts of a polyethylene glycol 200 dimethacrylate (trade name: NK Ester 4G, produced by Sninnakamura Chemical Co., Ltd.), 50 parts of urethane acrylate (trade name: U-N-01, produced by Sninnakamura Chemical Co., Ltd.), 3 parts of a polyisocyanate compound (trade name: Colonate L, produced by Nippon Polyurethane Industry Co., Ltd.) and 3 parts of benzyldimethylketal as a photopolymerization initiator. The mixture was then uniformly stirred to obtain an ultraviolet-curing adhesive solution A.

Separately, an adhesive solution obtained in the same manner as mentioned above except that the foregoing adhesive solution A was free of benzyl dimethyl ketal as a photopolymerization initiator was applied to one side of a polyester peelable film having a thickness of 38 μm and a width of 250 mm to a dry thickness of 10 μm to provide an ordinary adhesive layer thereon. A polyester peelable film having a thickness of 38 μm was then stuck to the surface of the ordinary adhesive layer. Subsequently, the foregoing ultraviolet-curing adhesive solution A was applied to the other side of the base material film to a dry thickness of 10 μm to provide an adhesive layer as a cleaning layer thereon. A similar peelable film was then stuck to the surface of the adhesive layer.

The resulting sheet was then irradiated with ultraviolet light having a central wavelength of 365 nm in an integrated dose of 1,000 mJ/cm$^2$ to obtain a cleaning sheet according to the invention. The peelable film was then peeled off the cleaning sheet on the cleaning layer side thereof. The cleaning sheet which had been cured with ultraviolet light exhibited a friction coefficient of 1.7 and a tensile modulus of 50 N/mm$^2$. For the measurement of friction coefficient, a stainless steel plate having a size of 50 mm×50 mm was allowed to move along the surface of the cleaning layer in a predetermined direction at a rate of 300 mm/min at a vertical load of 9.8 N. The resulting frictional resistance was then measured by a universal tensile testing machine. The measurement of tensile modulus was conducted by a testing method according to JIS K7127.

The peelable film was then peeled off the cleaning sheet on the ordinary adhesive layer side thereof. The cleaning sheet was then stuck to the back side (non-cleaning surface) of a contact pin cleaner (trade name: Passchip, produced by PASS INC.) as a contact pin cleaning member having the shape of an 8 inch silicon wafer with a hand roller to prepare a conveying cleaning member for cleaning function.

Subsequently, the peelable film was peeled off the cleaning member on the cleaning layer side thereof. The cleaning member was then dummy-conveyed through the interior of a wafer probe which is a conduction inspection equipment for the production of semiconductor to clean the contact pin and the chuck table. As a result, the cleaning layer didn't firmly adhere to the contact position. Thus, the conveyance was made without any troubles.

Thereafter, the contact pin was observed under microscope. As a result, it was confirmed that foreign matters such as oxide which had been attached to the contact pin before cleaning disappeared, demonstrating that the contact pin had been cleaned. Further, silicon tailings having a size of about 1 mm which had been found on the chuck table before cleaning were found to disappear completely, demonstrating that the chuck table was cleaned. Thereafter, wafers as products were conveyed and inspected on an actual basis. As a result, processing was made without any problems.

EXAMPLE 8

To 100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were added 50 parts of a polyethylene glycol 200 dimethacrylate (trade name: NK Ester 4G, produced by Sninnakamura Chemical Co., Ltd.), 50 parts of urethane acrylate (trade name: U-N-01, produced by Sninnakamura Chemical Co., Ltd.), 3 parts of a polyisocyanate compound (trade name: Colonate L, produced by Nippon Polyurethane Industry Co., Ltd.) and 3 parts of a benzyl dimethyl ketal (Irgacure 651, produced by Ciba Specialty Chemicals Co., Ltd.) as a photopolymerization initiator. The mixture was then uniformly stirred to prepare an ultraviolet-curing adhesive solution A.

Separately, an ordinary pressure-sensitive adhesive solution A was obtained in the same manner as mentioned above except that the foregoing adhesive was free of benzyl dimethyl ketanol.

The ordinary pressure-sensitive adhesive solution A was applied to one side of a polyester base material film having a thickness of 25 μm and a width of 250 mm to a dry thickness of 10 μm to provide an ordinary adhesive layer. A polyester peelable film having a thickness of 38 μm was then stuck to the surface of the ordinary adhesive layer. The foregoing ultraviolet-curing adhesive solvent A was applied to the other side of the base material film to a dry thickness of 30 μm to provide an adhesive layer as a cleaning layer. A similar peelable film was stuck to the surface of the adhesive layer to prepare a cleaning sheet A.

The ultraviolet-curing adhesive A was then measured for tensile modulus (testing method: JIS K7127). As a result, it exhibited a tensile modulus of 0.1 N/mm$^2$ before it underwent curing reaction by ultraviolet light. The ultraviolet-curing adhesive A which had been irradiated with ultraviolet light having a central wavelength of 365 nm in an integrated dose of 1,000 mJ/cm$^2$ exhibited a tensile modulus of 49 N/mm$^2$.

The cleaning sheet A thus obtained was then stuck to a wafer by a direct cutting type tape sticker (NEL-DR8500II, produced by NITTO SEIKI INC.). During this procedure, the sheet A was stuck to the back side (mirror surface) of an 8 inch silicon wafer, and then cut into the shape of wafer by direct cutting process. This operation was continuously conducted over 25 sheets. As a result, no cutting wastes were produced during sheet cutting.

Thereafter, 5 sheets of the wafers with sheet were irradiated with ultraviolet light having a central wavelength of 365 nm in an integrated dose of 1,000 mJ/cm$^2$ to prepare a conveying cleaning wafer A with a cleaning function.

Separately, 4 sheets of brand-new 8 inch silicon wafers were each measured for the presence of foreign matters having a size of not smaller than 0.2 μm on the mirror surface thereof by a laser type foreign matter analyzer. As a result, foreign matters having a size of not smaller than 0.2 μm were found in a number of 8 on the first sheet, 11 on the second sheet, 9 on the third sheet and 5 on the fourth sheet. These wafers were conveyed to the interior of separate substrate processing equipments having an electrostatic attraction mechanism with its mirror surface facing downward, and then measured for the presence of foreign matters having a size of not smaller than 0.2 μm by a laser type foreign matter analyzer. As a result, foreign matters having a size of not smaller than 0.2 μm were found on an 8 inch wafer size area in a number of 31,254 on the first sheet, 29,954 on the second sheet, 28,683 on the third sheet and 27,986 on the fourth sheet.

Subsequently, the peelable film was peeled off the foregoing conveying cleaning wafer A on the cleaning layer side thereof. The conveying cleaning wafer A was then conveyed to the interior of the substrate processing equipment having the wafer stage having 31,254 foreign matters attached thereto. As a result, the conveyance was made without any troubles. Thereafter, a brand-new 8 inch silicon wafer was conveyed to the interior of the substrate processing equipment with its mirror surface facing downward, and then measured for the presence of foreign matters having a size of not smaller than 0.2 μm by a laser type foreign matter analyzer. This operation was conducted 5 times. The results are set forth in Table 1.

EXAMPLE 9

A cleaning sheet B was prepared in the same manner as in Example 8 except that as an ultraviolet-curing adhesive there was used an ultraviolet-curing adhesive solution B prepared by a process which comprises adding 100 parts of a polyfunctional urethane acrylate (trade name: UV 1700B, produced by Nippon Synthetic Chemical Industry Co., Ltd.), 3 parts of a polyisocyanate compound (trade name: Colonate L, produced by Nippon Polyurethane Industry Co., Ltd.) and 10 parts of benzyl dimethyl ketal (trade name: Irgacure 651, produced by Ciba Specialty Chemicals Co., Ltd.) as a photopolymerization initiator to 100 parts of an acrylic polymer (weight-average molecular weight: 2,800,000) obtained from a monomer mixture comprising 30 parts of 2-ethylhexyl acrylate, 70 parts of methyl acrylate and 10 parts of acrylic acid, and then stirring uniformly the mixture. The ultraviolet-curing adhesive B was then measured for tensile modulus. As a result, it exhibited a tensile modulus of 0.01 N/mm$^2$ before it underwent curing. The ultraviolet-curing adhesive B which had been irradiated with ultraviolet light having a central wavelength of 365 nm in an integrated dose of 1,000 mJ/cm$^2$ exhibited a tensile modulus of 1,440 N/mm$^2$.

The foregoing cleaning sheet B was then subjected to direct cutting process in the same manner as in Example 8 to prepare 25 sheets of wafers with sheet. As a result, no cuttings were produced during sheet cutting. Five out of the 25 sheets of wafers were then irradiated with ultraviolet light having a central wavelength of 365 nm in an integrated dose of 1,000 mJ/cm$^2$ to prepare a conveying cleaning wafer B with a cleaning function.

Subsequently, the peelable film was peeled off the foregoing conveying cleaning wafer B on the cleaning layer side thereof. The conveying cleaning wafer B was then conveyed to the interior of the substrate processing equipment having the wafer stage having 29,954 foreign matters attached thereto. As a result, the conveyance was made without any troubles. Thereafter, an 8 inch silicon wafer was conveyed to the interior of the substrate processing equipment with its mirror surface facing downward, and then measured for the presence of foreign matters having a size of not smaller than 0.2 μm by a laser type foreign matter analyzer. This operation was conducted 5 times. The results are set forth in Table 1.

COMPARATIVE EXAMPLE 8

A wafer with sheet was prepared by direct cutting process in the same manner as in Example 8 except that a cleaning sheet C prepared by a process which comprises irradiating the cleaning sheet A with ultraviolet light having a central wavelength of 365 nm in an integrated dose of 1,000 mJ/cm$^2$ before being stuck to the wafer. As a result, a large amount of cutting wastes were produced from the cleaning layer during sheet cutting. These cuttings were then much attached to the edge of the wafer with sheet, the back side of the wafer and the tape sticker. Accordingly, the preparation of the wafer C with sheet was suspended.

COMPARATIVE EXAMPLE 9

A cleaning sheet D was prepared in the same manner as in Example 8 except that as an adhesive for cleaning layer there was used the pressure-sensitive adhesive solution A described in Example 8. The cleaning layer in the cleaning sheet D exhibited a tensile modulus of 0.1 N/mm$^2$.

The cleaning sheet D was then subjected to direct cutting in the same manner as in Example 8 to prepare a wafer with sheet. As a result, no cutting wastes were produced during sheet cutting. 25 sheets of wafers with sheet were prepared. It was then tried to convey the conveying cleaning wafer D to the interior of the substrate processing equipment having a wafer stage having 27,986 foreign matters attached thereto. As a result, the conveying cleaning wafer D adhered to the wafer stage during the conveyance of the first sheet. Thus, the cleaning wafer D could no longer be conveyed.

| | Percent removal of foreign matters | | | | |
|---|---|---|---|---|---|
| | 1 sheet conveyed | 2 sheets conveyed | 3 sheets conveyed | 4 sheets conveyed | 5 sheets conveyed |
| Example 8 | 85% | 92% | 96% | 96% | 96% |
| Example 9 | 70% | 75% | 83% | 83% | 83% |
| Comparative Example 8 | The preparation of cleaning wafer was suspended. | | | | |
| Comparative Example 9 | Troubles in conveyance | Conveyance suspended | Conveyance suspended | Conveyance suspended | Conveyance suspended |

INDUSTRIAL APPLICABILITY

As mentioned above, the cleaning sheet according to the invention can certainly be conveyed through the interior of a substrate processing equipment as well as can simply and certainly remove foreign matters attached to the interior of the equipment.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

The invention is:

1. A cleaning apparatus comprising a cleaning layer having substantially no tackiness, a Vickers hardness of not lower than 10 and having a tensile modulus of not lower than 10 N/mm$^2$ as determined according to JIS K7127 when applied to a foreign matter in an equipment to be cleaned;

a base material for supporting the cleaning layer on one side thereof; and an ordinary adhesive layer provided on the other side of said base material;

wherein the adhesive layer attaches a conveying member to the base material so that an outer surface of the conveying member comprises an outer surface of the cleaning apparatus opposite the cleaning layer; and wherein the outer surface of the conveying member has substantially no tackiness so that the tackiness of both the cleaning layer and the outer surface of the cleaning apparatus opposite the cleaning layer does not change when the cleaning layer is applied to the foreign matter in the equipment to be cleaned; and wherein the conveying member is a semiconductor.

2. A cleaning apparatus comprising a cleaning layer having substantially no tackiness and having a tensile modulus of not lower than 10 N/mm$_2$ as determined according to JIS K7127 when applied to a foreign matter in an equipment to be cleaned;

a base material for supporting the cleaning layer on one side thereof; and an ordinary adhesive layer provided on the other side of said base material;

wherein the adhesive layer attaches a conveying member to the base material so that an outer surface of the conveying member comprises an outer surface of the cleaning apparatus opposite the cleaning layer; and wherein the outer surface of the conveying member has substantially no tackiness so that the tackiness of both the cleaning layer and the outer surface of the cleaning apparatus opposite the cleaning layer does not change when the cleaning layer is applied to the foreign matter in the equipment to be cleaned; and wherein the conveying member is a semiconductor.

3. A cleaning apparatus according to claim 2, wherein said cleaning layer exhibits a 180° peel adhesion of not higher than 0.20 N/10 mm with respect to a mirror surface of a silicon wafer.

4. A cleaning apparatus according to claim 2, wherein said cleaning layer has substantially no tackiness and substantially no electrical conductivity.

5. A cleaning apparatus according to claim 4, wherein said cleaning layer having substantially no tackiness and substantially no electrical conductivity is made of a plastic material or film.

6. A cleaning apparatus according to claim 2, wherein said cleaning layer exhibits a surface free energy of less than 30 $mJ/m^2$.

7. A cleaning apparatus according to claim 6, wherein said cleaning layer exhibits a contact angle of greater than 90 degrees with respect to water.

8. A cleaning apparatus according to any one of claims 2 and 1, wherein said cleaning layer comprises an adhesive layer and has been cured by an active energy.

9. A cleaning apparatus according to claim 8, wherein said cleaning layer is obtained by subjecting a pressure-sensitive adhesive polymer containing at least a compound having one or more unsaturated double bonds per molecule and a polymerization initiator to polymerization curing reaction with an active energy so that the tackiness thereof substantially disappears.

10. A cleaning apparatus according to claim 9, wherein said active energy is ultraviolet light.

11. A method for cleaning a substrate processing equipment, comprising a step of conveying any one of a cleaning apparatus according to claim 2 to an interior of the substrate processing equipment.

12. A cleaning member for conduction inspection equipment comprising:

a contact pin cleaner for removing foreign matters attached to a conduction inspection contact pin of said conduction inspection equipment; and a cleaning apparatus according to claim 2 provided on one side of said contact pin cleaner for removing foreign matters attached to a contact area of an equipment with which said contact pin cleaner comes in contact.

13. A cleaning member for conduction inspection equipment comprising:

a contact pin cleaner provided on one side of a conveying member for removing foreign matters attached to a conduction inspection contact pin of said conduction inspection equipment; and a cleaning apparatus according to claim 2 provided on one side of said contact pin cleaner for removing foreign matters attached to a contact area of an equipment with which said contact pin cleaner comes in contact.

14. A method for cleaning a conduction inspection equipment, comprising a step of conveying a cleaning member according to any one of claims 12 and 13 an interior of said conduction inspection equipment.

15. A cleaning apparatus according to claim 2, wherein said cleaning layer exhibits a friction coefficient of not lower than 1.0.

16. A cleaning apparatus according to claim 2, wherein said cleaning layer has substantially no tackiness and a tensile modulus of not higher than 2,000 $N/mm^2$ as determined according to JIS K7127.

* * * * *